US006422986B1

(12) United States Patent
Claybaker et al.

(10) Patent No.: US 6,422,986 B1
(45) Date of Patent: Jul. 23, 2002

(54) SEALER APPARATUS FOR FORMING A CROSS SEAL IN PLASTIC FILM PROCESSING AND PARTICULARLY FOR BAG MAKING MACHINES

(75) Inventors: Peter J. Claybaker; Thomas D. Driscoll; Giles R. Blaser, all of Green Bay, WI (US)

(73) Assignee: Amplas, Inc., Green Bay, WI (US)

( * ) Notice: Subject to any disclaimer, the term of this patent is extended or adjusted under 35 U.S.C. 154(b) by 0 days.

(21) Appl. No.: 09/420,248

(22) Filed: Oct. 19, 1999

(51) Int. Cl.[7] .............................................. B31B 49/04
(52) U.S. Cl. ........................ 493/189; 493/197; 493/205; 493/209
(58) Field of Search ................................ 493/205, 209, 493/189, 186, 197, 215; 156/552, 583.1

(56) References Cited

U.S. PATENT DOCUMENTS

| | | | |
|---|---|---|---|
| 2,749,817 A | | 6/1956 | Piazze et al. |
| 3,654,841 A | | 4/1972 | Davis, Jr. |
| 3,965,333 A | * | 6/1976 | Elsner et al. |
| 4,016,026 A | * | 4/1977 | Grevich |
| 4,317,697 A | | 3/1982 | McLean |
| 4,449,962 A | | 5/1984 | Copia |
| 4,553,377 A | * | 11/1985 | Klinkel |
| 4,692,135 A | * | 9/1987 | Johnson |
| 4,714,454 A | | 12/1987 | Herrington |
| 4,753,629 A | | 6/1988 | Powell et al. |
| 4,881,933 A | * | 11/1989 | Wech |
| 4,994,137 A | * | 2/1991 | Yanai |
| 5,002,522 A | | 3/1991 | Feustel |
| 5,015,223 A | | 5/1991 | Boeckmann |
| 5,015,325 A | * | 5/1991 | Bennett et al. |
| 5,236,543 A | * | 8/1993 | Riedel |
| 5,529,659 A | | 6/1996 | Ellsworth et al. |
| 6,190,296 B1 | * | 2/2001 | Gnad et al. |

* cited by examiner

Primary Examiner—Eugene Kim
(74) Attorney, Agent, or Firm—Andrus, Sceales, Starke & Sawall (57) ABSTRACT

A cross sealer for a bag making machine includes a frame with an upper seal bar unit and a lower seal bar unit in aligned opposed relation. One is movable seal bar unit which includes a rigid support beam of a lightweight construction and a light weight seal bar connected to the beam by a plurality of adjustable stud units for adjusting the position of the seal bar. A rotating shaft spans the cross sealer and is connected by a plurality of eccentric linkages to the beam between side plates of the frame. The linkages support the beam and seal bar and transfers the sealing force onto the beam and bar for moving the bar into sealing engagement across the width of the web. The opposed seal bar unit is similarly constructed with a beam and a seal bar with the units interconnected by adjustable stud connectors. The second seal bar unit is mounted as a substantially stationary unit and includes a plurality of substantially fixed connectors supporting of the fixed beam along a plurality of locations to form a relatively rigid beam support. Alternate fixed beam supports include air cylinders to provide a cushion support for the seal unit. The connecting studs in the opposed seal units are offset to allow the respective beams to deflect and conform more fully to each other and to form an effective smooth and constant seal across the web. The eccentric shaft is shown driven by a servo motor and alternatively by a fluid cylinder and linkage drive unit. The drive system includes a controlled drive and linkage to provide for various seal dwell periods and configurations.

28 Claims, 11 Drawing Sheets

SEALER APPARATUS FOR FORMING A CROSS SEAL IN PLASTIC FILM PROCESSING AND PARTICULARLY FOR BAG MAKING MACHINES

BACKGROUND OF THE INVENTION

This invention relates to a sealer apparatus and particularly to cross sealers and presealers for forming thermal seals of layered plastics which extend across relatively wide webs, and particularly in bag making machines.

The processing of plastic webs into bags and other like plastic members may include a relatively wide web passed through a single machine to form a plurality of bags or other members. The plastic layers in the web are sealed to each other along lines generally extended across the web by passing of the wide web through a cross sealer or a presealer having opposed seal bars spanning the web and in which the web is moved in stepped sequence. During a short seal period, the web is clamped between the seal bars to provide a thermal seal of the webs to each other. Generally, prior art cross sealers and presealers included opposed movable seal bar units which span the entire seal width of the machine. The movable seal bar structures are supported for reciprocal movement into and from engagement with each other. The movable seal bar units are secured at one end or both ends to a drive unit. A cam driven mechanism and the associated connections to the seal bars are driven by an appropriate power system such as an AC motor drive, a servo motor drive or even an air cylinder drive. The cam driven mechanism includes separate cam assemblies at each side plate of the machine with the cam assemblies secured to the opposite ends of a single rotating shaft. The respective cam assemblies are coupled to the outer ends of the seal bar and designed to move the heavy seal bar and establish an adequate seal pressure to affect the desired seal over the entire seal width of the machine. Another design has included multiple air cylinders spaced across the seal bars. The prior art machines require relatively massive seal bar structures which establish an extremely rigid bar because of the high operational seal pressures required and to produce and maintain an even pressure across the length of the seal bar. The combination of the various parts creates so much inertia that a relatively slow rate of movement is required and with a dwell control, the machine speed is significantly limited. AC motors, in particular servo motor drives, produce a better control of the sealer mechanism and particularly the movable seal bar during the start/stop sequence. The performance is not considered adequate to fully provide in-line compliant seal bar movement with a modem bag making machine. Attempts made to increase the speed of the prior art sealers resulted in significant increase in maintenance problems and associated downtimes.

A typical prior art cross sealer assembly with the wide cross seal bars often include a cloth covering applied to the seal surfaces of the seal bars to avoid attachment of the plastic webs to the sealing faces of the opposed seal bars. In such constructions, the cloth assembly is secured to the frame structure with a source roll of the cloth secured to one side of the seal bar. The cloth passes therefrom across the seal surface of the seal bar to a take-up roll which is rotatably mounted to the opposite side of the seal bar unit. Similar cloth assemblies are provided for both the upper and lower seal bar units. The cloth is typically a TEFLON material (trademark of E.I. duPont de Nemours and Company of Delaware, USA).

The wide web is often used where a plurality of laterally spaced members are formed within the single web to increase the production of product. Such machines are well known in the bag making machine for pouches and like plastic containers. A typical machine for example which had been commercially available had a web width of 1,240 millimeters. Although satisfactory bag making machines using wide cross sealers or presealers have been designed and sold, there is a need for improved cross sealers constructed to operate in a more rapid cycle time while maintaining the creation of acceptable cross seals of the plastic laminates.

SUMMARY OF THE INVENTION

The present invention is particularly directed to the design of wide plastic sealer units with a relatively compact design and in which the seal bar structure has a low inertia and is supported by a multiple of spaced mechanical linkages secured to a shaft of a common drive mechanism connected across the sealer apparatus. The rotating shaft is driven by an appropriate system, preferably a servo motor drive or a pneumatic cylinder drive, for rotating of the shaft and thereby raising and lowering of a seal bar in repetitive cycles through the spaced mechanical linkages. The multiple interconnecting mechanisms are preferably eccentric link unit or individual cam units mounted in spaced relation across the width of the sealer structure and attached to support a rigid support beam or like support structure for vertical movement. A light seal bar is secured to the support structure for movement into operative engagement with an opposed substantially rigid stationary and rigid support structure including an opposed seal bar. The multiple connecting mechanisms move the movable seal bar to the sealing position and develops a high seal pressure across the bar to seal the plastic laminates. The combination of the low inertia seal bar with the multiple linkages in combination with the opposed rigid stationary seal support structure provides a highly effective and relatively high speed sealing device. In this preferred system, only the one sealer bar is moved during the seal cycle while the other one is stationary and does not add to the inertia of the overall seal moving system. With the multiple connections, the seal bar system inertia is directly proportional to the width of the mechanism. The cross section of the seal bar remains the same and only requires an appropriate number of multiple links to maintain the uniform and high seal pressure across the seal bar unit.

In a preferred construction, a lightweight but rigid support beam is connected to the multiple linkages and connected to a seal bar by a plurality of adjustment units. The seal bar adjustment unit, such as threaded connecting studs, are staggered between the top and bottom seal bar units. This establishes a natural deflection of the fixed seal bar between the studs of the upper seal bar to offset any deflection of the lower seal bar. As a result the bars fully conform to each other and establish and assure a better seal integrity across the web width. The seal bar units are designed to permit easy variation in the width or character of the seal produced. For example, a stationary or movable seal bar may be readily formed to receive different inserts along the length of the bar. Similarly, the movable bar can be readily formed by milling or otherwise forming of different patterns in the face of the movable bar.

In the preferred construction, the movable seal bar is also designed to be connected to the rotating shaft by the different connecting mechanisms which allow for adjustment of the web seal line to the thickness of the web material being passed therethrough. Thus, bubble pack and foam webs are generally significantly thicker material and require different movement of the seal bars.

A preferred stationary seal bar unit includes a similar rigid support structure interconnected to a seal bar by a plurality of like adjustable interconnections such as adjustable studs. The system is mounted for limited reciprocal movement with a plurality of laterally spaced support structures, some of which include a air cylinder or like member, to establish and maintain the desired seal pressure. The cylinder units permit dropping of the sealer when the machine is stopped so as to prevent the continued heated engagement of the stationary seal bar with the web structure. In the latter preferred construction, the adjustment studs for the respective first and second seal bars are offset relative to each other. In the operation of the unit which requires relatively high pressures any deflection within the seal bars tend to conform to each other and maintain an optimal seal pressure across the web.

The present inventor has further discovered that the seal bars may be coated with a release coating which prevents the softened and molten plastic from adhering to the face of the hot seal bar or bars. This eliminates the special moving cloth member passed over the seal bar faces between the seal bars and the web laminates; thereby reducing the initial cost and maintenance of such mechanisms.

The present invention with the multi-connections across the seal bar unit produces an improved thermal seal with an increased speed, with cost effective result.

Various other features, objects and advantages of the invention will be made apparent from the following description taken together with the drawings.

BRIEF DESCRIPTION OF THE DRAWINGS

The drawings illustrate the best mode presently contemplated for carrying out the invention.

In the drawings:

FIG. 10 is a view of an eccentric drive to produce the motion of FIG. 9a.

DETAILED DESCRIPTION OF THE ILLUSTRATED EMBODIMENT

Figure 1:
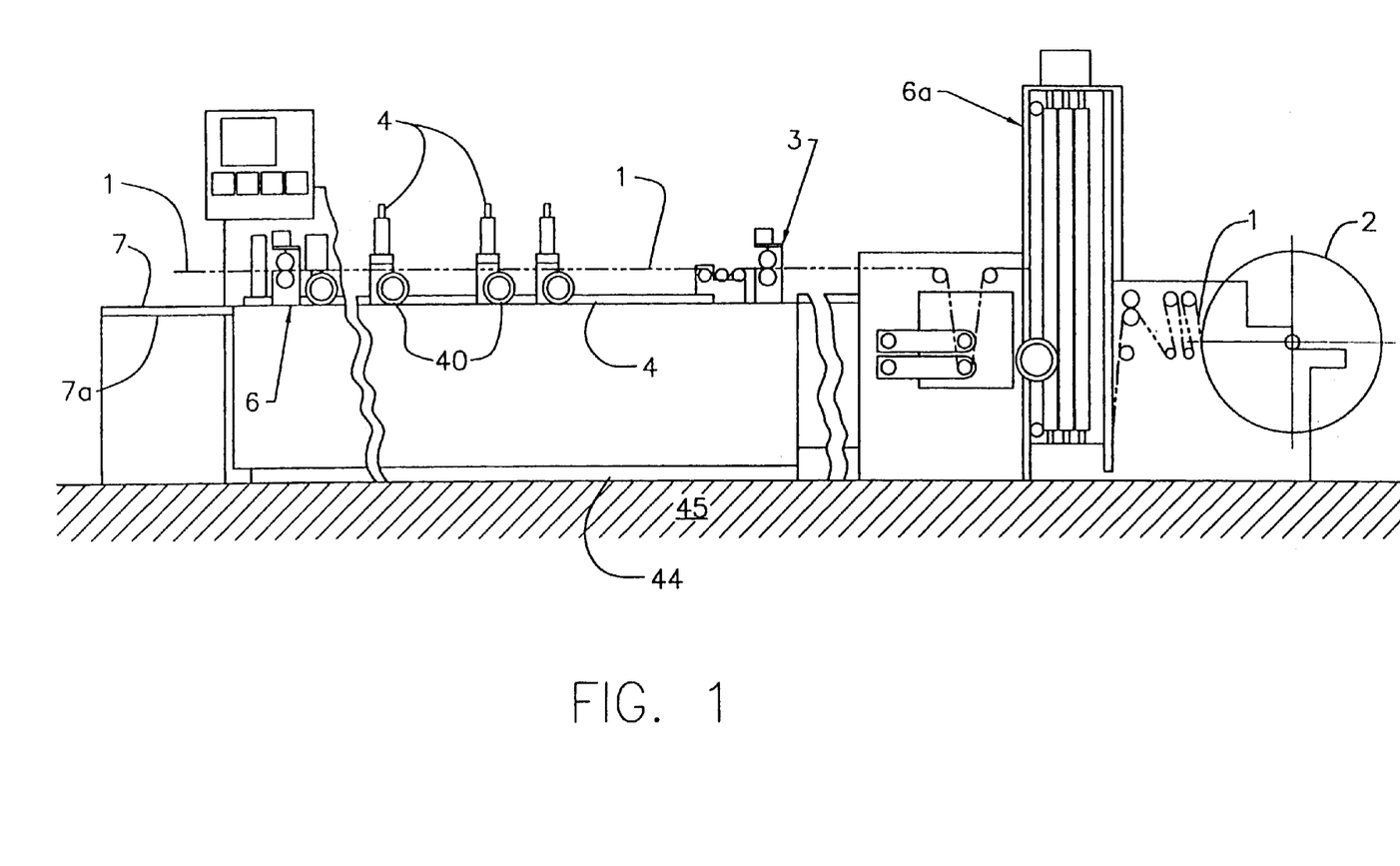
FIG. 1 is a diagrammatic illustration of a bag making line incorporating a sealer apparatus constructed in accordance with the present invention.
Figure 1A:
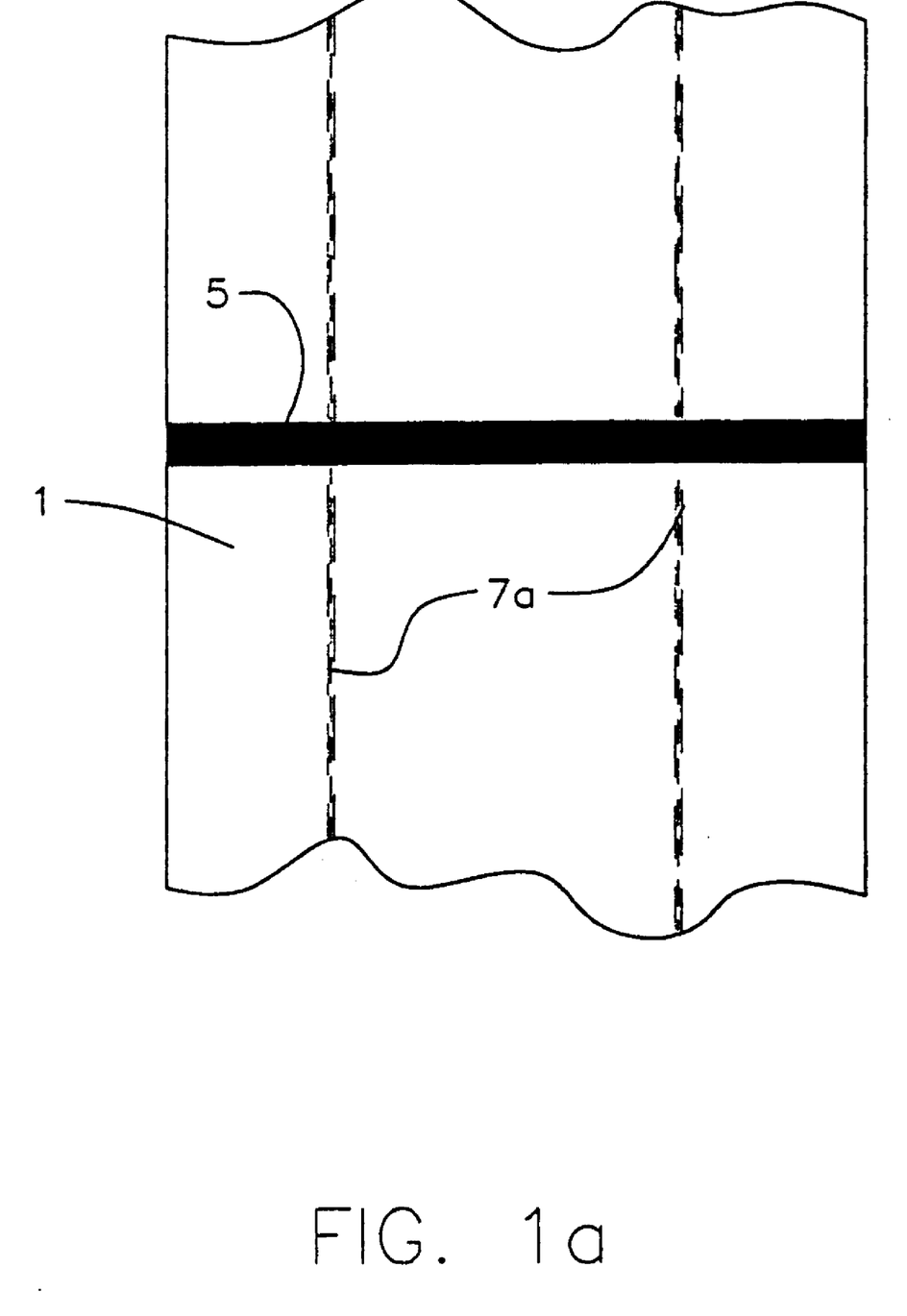
FIG. 1a is a diagrammatic view of a portion of a sealed web.

Referring to the drawings and particularly to FIG. 1, a bag making machine is illustrated in a simplified illustration. A multi-layered plastic web 1 is drawn from a suitable supply such as a web roll 2 which is mounted within the machine with a draw roll unit 3. The web is fed from the web roll 2 into a series of stations, not shown, which may provide various processing of the web such as imprinting of the web with appropriate material, heating and cooling of the web, various tension controls, cutting of the web to form bags, and other well known processes. The web 1 may have a width equal to a plurality of individual final bag members to be formed from successive portions of the web 1 (FIG. 1a). The web is fed from the roll 2 into a seal assembly 4 particularly constructed in accordance with the teaching of the present invention to form a seal or seam 5 extended completely across the web 1. The sealed web passes into a cutter unit 6 in which the leading portion of the web is severed along the seal line to remove the leading portion of the web and form bags 7 which are stacked on a table 7a.

A plurality of bags may be formed for each web width. A slitter unit 6a is mounted upstream of the sealer assembly 4 and cuts the web 1 as at 7a forming a series of side-by-side web members (FIG. 1a) which in combination with cutter unit 6 form individual bags. A slitter unit used at 6a may cut and reseal the web forming closed edges 7a to form side-by-side tubular webs closed to the sides or may selectively seal the slit edges to form webs open to one side.

The cutter unit 6 can be formed to either side of seal 5 or centrally of seal 5 depending on bag configuration. If webs are tubular webs and it is cut to the front of the seal, the downstream seal provides the bottom of the bag while the upstream cut defines the open end of the bag. Conversely, if the cut is formed after passing of the seam or seal 5 through the cutter 6, the upstream end of the web forms the bottom of the previous bag while the cut end forms the open end of the immediately following bag. If centered on the seal 5, it closes the edges of the two adjacent bags.

The above described systems of forming the side-by-side webs of tubular construction or with an open side construction is conventional and well known.

As referenced herein, a multi-layered plastic web can therefor be formed in any desired system. The web may be withdrawn in a tubular form, or formed as a folded single web. Alternatively, entirely separate webs can be multi-layered and passed in superimposed relation through the line. Further a plurality of individual lines can be passed through the system in side-by-side relation in any desired system. The present invention is thus broadly directed to any system particularly a bag making system, where there is a requirement for sealing of a overlying plastic element to each other across the width thereof and which is of relatively wide width and with the use of a thermal heating system.

The illustrated embodiment of the invention is therefore particularly directed to an improved plastic sealing apparatus and method for forming of plastic bags and a preferred embodiment is illustrated more fully in FIGS. 2–7, inclusive. In this embodiment, the plastic web is a folded web with the individual side-by-side webs formed as at 7a to have one side open and the opposite side sealed. The seam 5 thus forms the sides of the bags 7. The cutter unit 6 is therefor centered on the seal seam 5 and forms the adjacent sides of adjacent bags 7.

Figure 2:
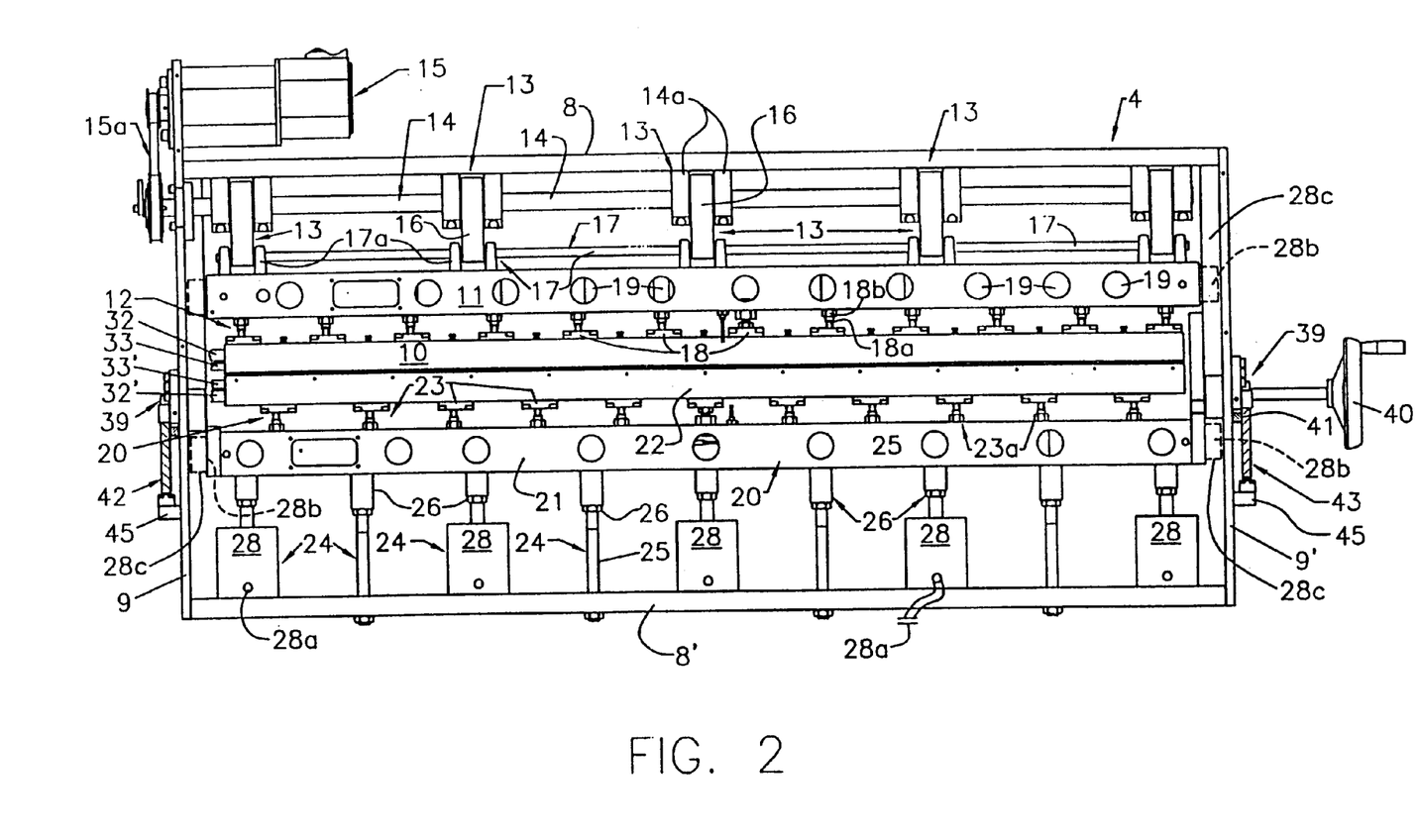
FIG. 2 is front elevational view of a sealer machine for a system of FIG. 1.
Figure 3:
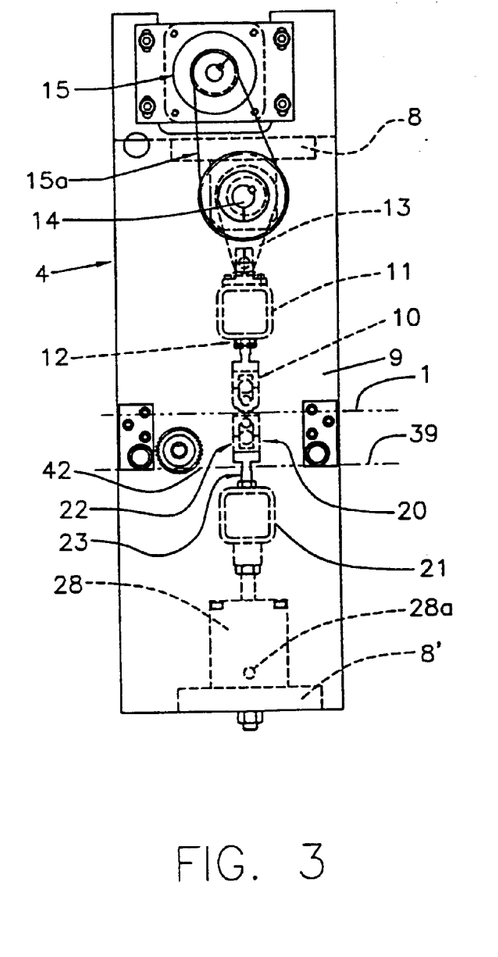
FIG. 3 is a side elevational view taken from the left side of FIG. 2 of the sealer machine.
Figure 4:
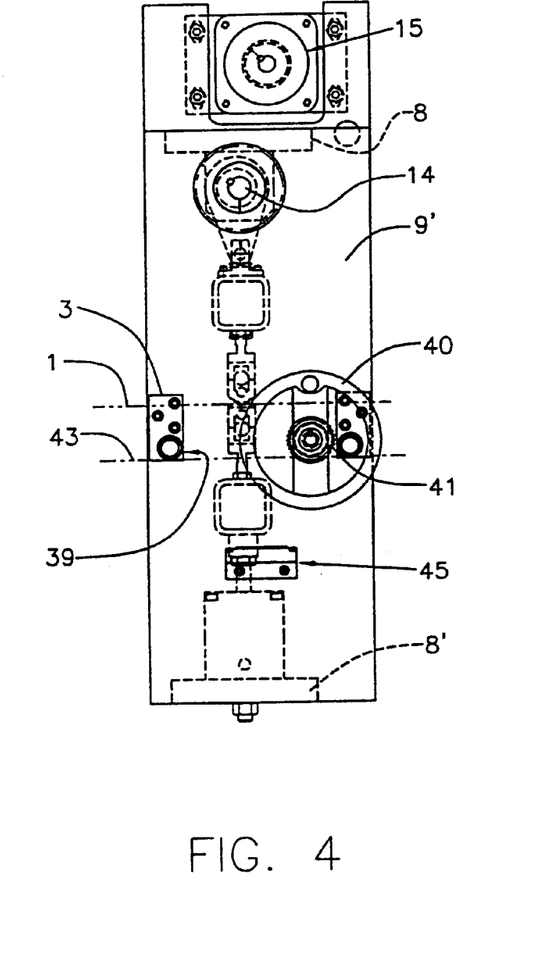
FIG. 4 is a view from the right side of FIG. 2.

Referring particularly to FIGS. 2, 3 and 4, the illustrated embodiment includes a basic frame structure for mounting of the forming and operating mechanism through which the web 1 is passed through seal assembly or unit 4. The illustrated frame structure consists of an encircling rigid frame including an upper frame member 8 and a lower frame member 8' which are in vertical aligned relation and interconnected to each other by side frame members or plates 9 and 9', respectively. A vertically moving upper seal bar member 10 is located within the frame and interconnected to an upper seal support beam 11 to form a movable seal bar unit 12. The upper seal unit or assembly extends laterally substantially throughout the width of the seal unit 4 between the plates 9 and 9'. Seal support beam 11 is connected and supported within the upper frame by a plurality of laterally spaced eccentric drive units 13 which are connected to and driven by a rotating shaft 14. The shaft is supported at the opposite ends in side plates 9 and 9'. A servo motor 15 is coupled through a drive coupling or connector 15a to rotate shaft 14 and provide a vertical movement of the seal bar unit 12 through units 13. The shaft 14 is rotatably mounted between the end plates 9 and 9' and each of the eccentric drive units 13 is direct coupled at each support position between the shaft 14 and the beam 10. As shown most clearly in FIGS. 5–7, each eccentric drive unit 13 includes a link 16 mounted on the eccentric shaft 14. Bearings 14a at each eccentric unit 13 are secured and rotatably support the shaft 14 to each side of and confine the link 16 of unit 13 therebetween. An eccentric bushing 16a of (FIG. 7) unit 13 is keyed to the shaft 14, or the shaft is integrally formed with such bushing, with its center offset from that of shaft 14. Rotation of the shaft 14 and bushing 16a results in vertical reciprocal movement of the link 16 which is interconnected to the seal support beam 11.

Figure 7:
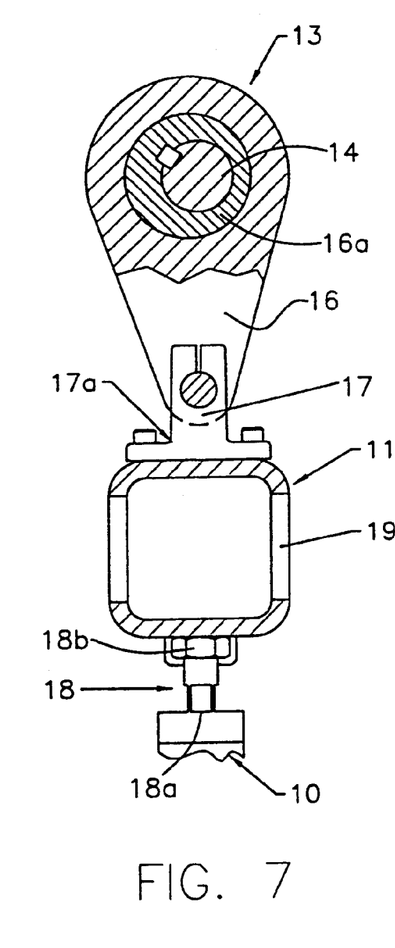
FIG. 7 is an enlarged view, partially in section, of an eccentric unit shown in FIGS. 2–6.

The eccentric link 16 is directly secured to the seal beam 11 by a wrist pin rod 17. The lower end of link 16 is attached to rod 17 with a bearing unit 17a located to the opposite sides of the link 13 and fixed to beam 11. The eccentric drive units 13 are relatively compact short assemblies which significantly reduces the spacing between the drive shaft and the seal beam and thereby the overall height of the seal bar assembly.

The seal beam 11 is connected to the seal bar 10, which has a slightly shorter length than the seal beam and the connection is made by a plurality of connecting mechanisms or units 18 to rigidly interconnect the bar 10 to the beam 11 at a plurality of relatively close spaced locations. The connecting units 18 illustrated include adjustment threaded studs 18a connected to the seal bar 10. A nut 18b is connected to the beam and threads onto the stud. This provides for vertical positioning of the seal bar 10 relative to the beam 11. The units 18 are located preferably equispaced across the seal bar between the very ends of the seal bar, with a plurality of the units between each of the link units 13. As shown, the seal bar 10 is slightly shorter in length than the beam 11 and the end units 18 are spaced inwardly on the beam. This provides a rigid support for the seal bar 10 while allowing some deflection of the seal bar 10, as more fully developed hereinafter.

As noted above it is important that the total assembly be made of a relatively lightweight construction particularly for the moving part of seal bar assembly. The illustrated beam 11 is a conventional square beam box-like member. The top and bottom may be formed as solid members to accommodate the interconnection to the various parts. The side walls are formed with spaced openings 19 to minimize the overall weight while maintaining the necessary and desired rigidity.

The rotation of the eccentric drive shaft 14 results in a vertical reciprocating movement of the beam 11 and a corresponding positioning of the seal bar 10 to locate the interconnected seal bar 10 between a raised position where it is spaced from an aligned bottom seal bar unit 20 and a lowered position where it is in operative sealing engagement with web 1 and the seal bar unit 20. Thus, the rotational movement of the eccentric shaft 14, and all of the links 16 of units 13, provide for appropriate vertical reciprocation of the seal bar 10 relative to the lower seal bar unit 20.

The lower seal bar unit 20 is constructed substantially similar to the upper seal bar unit. Thus the lower seal bar unit again includes a support beam 21 of the construction corresponding to that of the upper beam 11 and connected to a lower seal bar 22 by a plurality of adjustable stud connectors 23 in the same manner as the upper seal bar unit. Referring to FIGS. 2–3, the lower seal bar unit 20 is held in a substantially stationary orientation with respect to the upper seal bar unit 12 by a plurality of fixed connectors 24 shown in the form of rigid threaded rod connectors 25 which are interconnected to the lower beam or frame member 8' and are secured to the underside of the lower seal beam 21 by adjustable threaded connections 26. Alternate connectors 24 include an air cylinder unit 28. The cylinder units 28 form two functions. The air cylinder units include a controlled input 28a to provide lowering of the lower seal bar unit 20 from the operative position particularly during a nonoperative period of the bag making line. The lowered seal bar 22 is then spaced from the web path when the machine operation is stopped. This will avoid overheating of the aligned web while in the machine. In the normal seal cycle, the air cylinder units 28 further act as cushioning members to allow some slight penetration and lost motion. In a practical application the lost motion is on the order of five to ten thousandths (0.005–0.010) of an inch movement. The lower seal bar 22 may be formed with a rubber backup pad or aluminum bar as a sealing surface on the heated bar.

Figure 5:
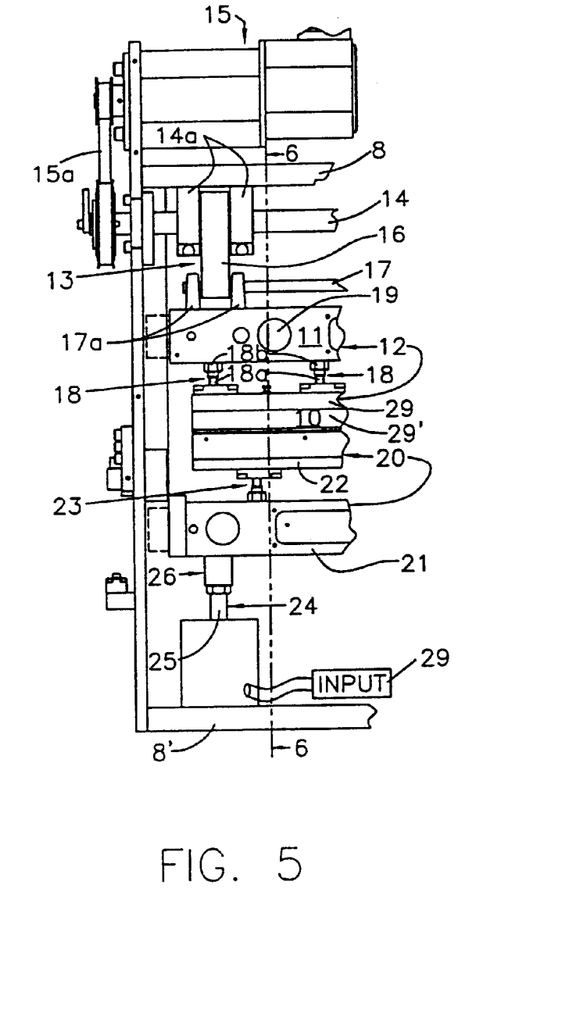
FIG. 5 is an enlarged fragmentary portion of FIG. 2 with parts broken away and sectioned to more clearly disclose details of construction.

The proper positioning of the seal bar units 12 and 20 is significant in order to establish an appropriate and desired interengagement between the seal bars 10 and 22 during the normal heating cycle of the bag web 1 in order to establish the desired seal depending upon the thickness and characteristic of the plastic material being sealed to each other. Referring to FIGS. 2 and 5, the upper and lower seal bar units 12 and 20 are guided in their motion to keep them in proper sealing relationship by guide blocks 28b mounted on the ends of the upper and lower seal support beams 11 and 20 respectively. These guide blocks engage a sealer guide slide 28c mounted on each of the side frames 9 and 9'.

As illustrated both upper and lower seal bar units 12 and 20 are basically of an identical construction consisting of the very lightweight but relatively strong seal beams 11–21 and seal bars 10–22.

The relatively light overall weight support in combination with the multiple eccentric drive units 13 establish very uniform raising and lowering forces across the seal bar assembly, with the only moving structure being that of the low inertia upper seal bar unit. This is in contrast to prior art systems which have had relatively substantial heavy moving components. The air cylinder support structure for the lower seal bar unit 20 in combination with the lightweight movable upper seal unit 12 permits rapid movement within the seal cycle without generation of noise or vibration while producing a highly effective even cross seal across the plastic web 1. The adjustment units or connectors 18 and 23 provide for precise location of the seal bar units, and particularly opposed bars 10 and 22, relative to each other and create a more optimal operation in sealing.

As illustrated in the preferred construction, the lower and upper adjustment units or connectors 18 and 23, are similarly equispaced and further are staggered relative to each other as shown. Thus, each set is located in equal spaced relation to each other but offset to align the lower adjustment connectors 23 substantially centrally between the location of the upper connectors 18. This permits some relative deflection of the seal bars 10 and 22 relative to each other and tend to offset the deflection of the seal bars. The result of this construction and configuration is that the seal bars more fully conform to each other during a seal cycle and thereby assure a better seal and improve the integrity of the final seals.

In summary, the illustrated structure of the seal bar units minimizes the total inertia in the moving portion of the sealing structure when contrasted to systems of conventional construction, particularly wherein both the upper and lower seal bars move. The multiple linkages provided across the width of the seal bar units promote establishing and maintaining of a constant seal pressure across the total width of the machine which is independent of the machine width. Thus, the linkages are spaced appropriately and if a wider machine is built additional linkages are provided to maintain the desired seal pressure. Further, the actual location of the eccentric support devices with the adjustable connections permit the relative positioning of the seal bar unit in accordance with the thickness or thinness of the plastic material as well as for different plastics. Thus, various plastics may require different heating and pressures. Further, plastic materials such as found in bubble pack or foam plastics are generally thicker and require a different web seal relationship between the seal bars then that required for relatively flat and relatively thin plastics.

The air cushioning effect of the air cylinder units 28 further contributes to the conformity and matching of the seal bars 10 and 22. The result is a more constant seal pressure over the width of the machine.

Seal bar 10 may be of any suitable lightweight construction which maintains a rigid support of the seal bar and preferably provides a minimal weight while maintaining the necessary rigidity and characteristic.

Figure 6:
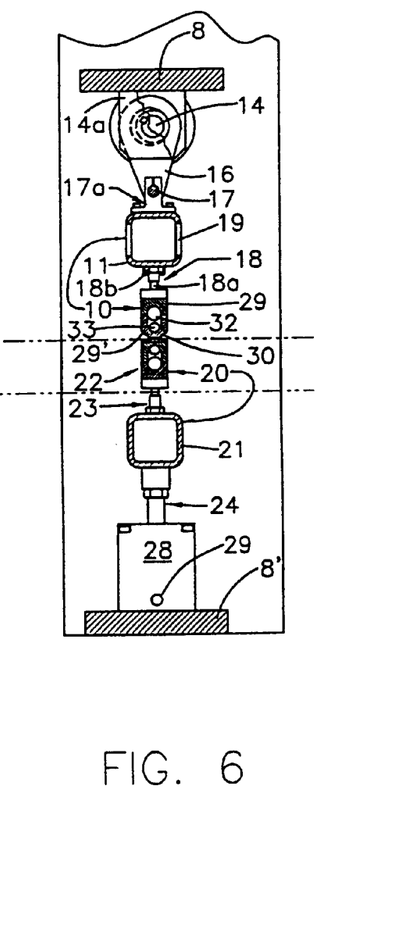
FIG. 6 is an enlarged vertical section taken generally on line 6–6 of FIG. 5.
Figure 8:
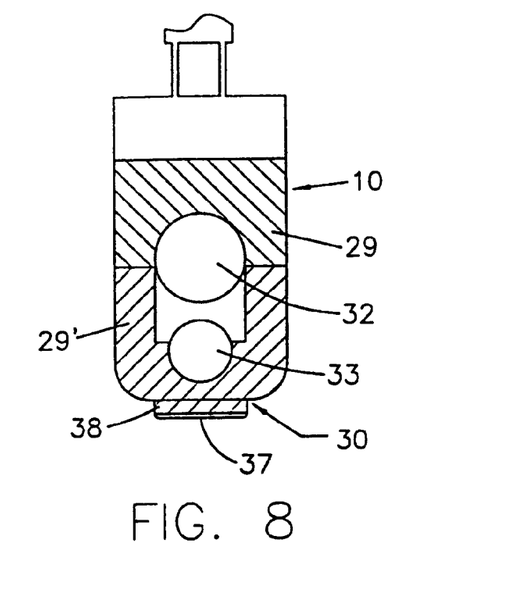
FIG. 8 is an enlarged cross sectional view of the sealer bar with an integrated coating for use in sealers of the type disclosed herein.

More particularly with reference to FIGS. 3, 6 and 8, the illustrated seal bar 10 is shown in the preferred construction. The seal bar 10 is formed as a rectangular channel member having upper and lower U-shaped channel parts 29 and 29', with the opposing legs interconnected to form the single substantially rectangular channel member. The upper part 29 is attached to the upper seal support beam 11 by the adjustment units 18. Bottom part 29' of seal bar 10 has a bottom inset face 30 defining the web seal surface, which has a predetermined width extended in the direction of the web movement. The surface may be a flat seal surface or configured to produce a pattern within the web. The seal bar 10 is preferably provided with a heating system. In the illustrated embodiment, heating tubes are provided. Referring to FIGS. 6 and 8, a relatively large tubular electric heater 32 is secured within the seal bar. A satisfactory heater tube is available from Watlow, Inc. Heater 32 is located within the upper channel part 29 of the seal bar 10. A slightly smaller heat distribution pipe 33 is located in downwardly spaced relation within the seal bar and generally within the base or bottom part 29'. The heat pipe 33 rapidly and efficiently transmits the heat along the length of seal bar. A satisfactory heat distribution pipe 33 is manufactured by Noren of California. The pipe 33 is a tubular closed chamber containing a fluid and a wicking system which rapidly and efficiently transmits heat along its length. This has the effect of equalizing the temperature of the sealing surface of the seal bar and thereby reducing temperature gradients between areas where webs are being sealed and where they are not. The lower seal bar 22 is again similarly constructed.

The present inventor further discovered that there are various metal coatings that can be readily plated to the sealing surfaces of thermal seal bars used in bag making machines which essentially eliminate the attachment of the softened or molten plastic web 1 to the seal bar surfaces. Referring particularly to FIG. 8, a cross section of the bar 10 is illustrated. The material 37 is plated to the face of the seal bar 10 as at 38. A preferred material is a metal coating sold under the trademark PLASMADIZE of General Magnoplate of New Jersey. The material is readily plated to the steel face of a seal bar and establishes a long release life for the bar with respect to the molten plastic film and particularly the polyethylene plastics widely used in forming of plastic bags. The preferred material is a composite of metals, ceramics, polymers and/or dry lubricants which forms a thick, dense coating which is available with non-sticking surfaces. The plated surface material 37 eliminates the well known prior art method of providing a tape moved over the respective surfaces to prevent any possible attachment to the web.

Figure 8A:
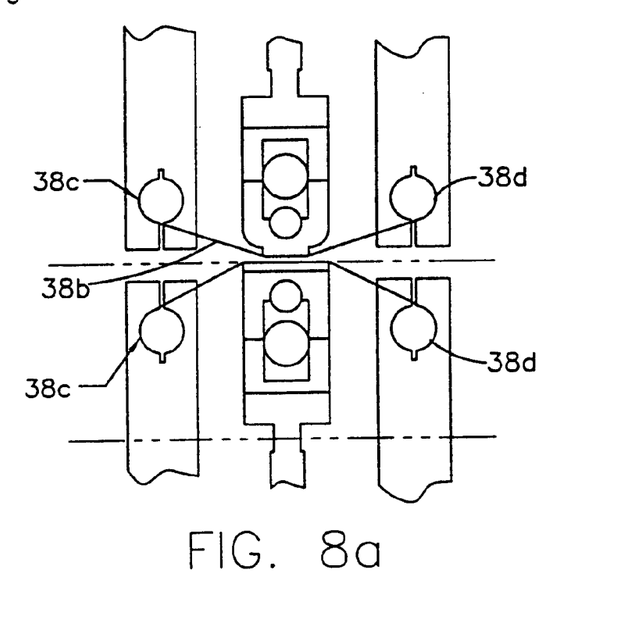
FIG. 8a is a fragmentary view of the system illustrating application of cloth curtain to seal bars.

In accordance with alternative structure, and conventional practice, a teflon cloth curtains 38a and 38b, as shown in FIG. 8a, may cover the seal bars 10 and 22 and prevent the molten plastic from adhering to the bar during the sealing process. As the teflon cloth wears, the curtain is periodically advanced using supply and rewind rolls 38c and 38d to store the cloth.

As previously described, the lower seal bar unit 20 is formed of a generally identical construction to that of the upper seal bar unit 12 and no further description thereof is given. Corresponding elements are identified by corresponding primed numbers. The lower seal bar unit 20 however is not necessarily formed with the similar lightweight construction but the construction is desired in order to provide for the slight lost motion movement, the retraction when the line is not running and the like without increasing the stresses within the operating mechanism.

Although the seal bar units are formed with relatively rigid beam members, the movable seal bar and the fixed seal bar operate under relatively high pressures, generally in the range of 43 to 54 PSI. A minute deflection of the bars can be anticipated. However, with the lightweight construction in combination with the compensating deflection construction of the bars as such which is provided by the teaching of the illustrated embodiment, an optimal seal is more readily established.

Figure 10:
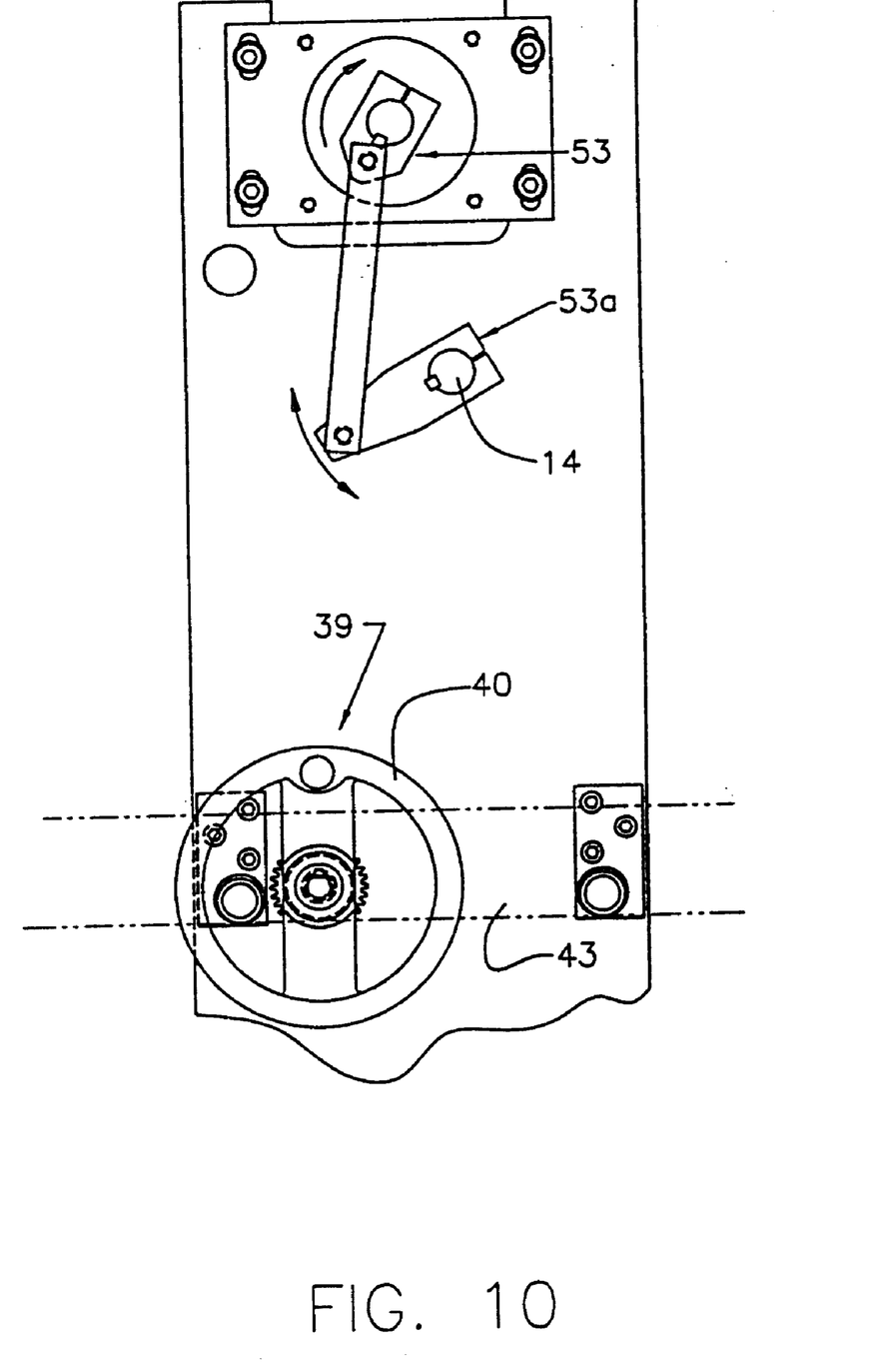

The seal assembly 4, as diagrammatically shown in FIGS. 1–3 is shown mounted on cam follower roller units 39 at opposite sides of the frame 9 and 9' for positioning relative to the other system components. As shown in FIGS. 2, 4 and 10, hand wheel 40 of a gear driven mechanism 41 couples the frame structure 9—9' to supporting rails 42 and 43 (shown diagrammatically) defining a part of a base structure, not shown, for supporting the seal assembly 4 on the floor, not shown. Rotation of the hand wheel 40 moves the seal bar assembly along the path of the web for location with respect to the other system components. Lock downs 45, which include pneumatic or other suitable operators, on opposite sides of the frame plates 9 and 9' provide for securing of the seal bar assembly in the desired location. Mechanisms for supporting an assembly for fixed or adjustable location of sealers are well known and no further description thereof is given. Obviously any other manual or powered system may be readily provided for desired movement of a seal assembly by those familiar with machine adjustments and the above description does not limit the application or structure of the present invention.

Figure 9:
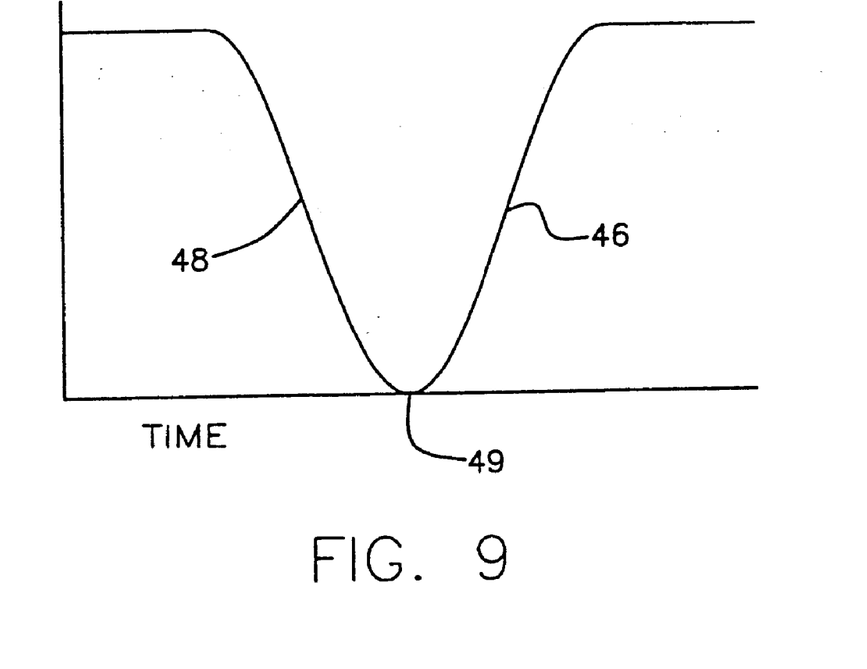
FIGS. 9a and 9b are views of motion profiles established by the illustrated embodiment of FIGS. 2—7.
Figure 9A:
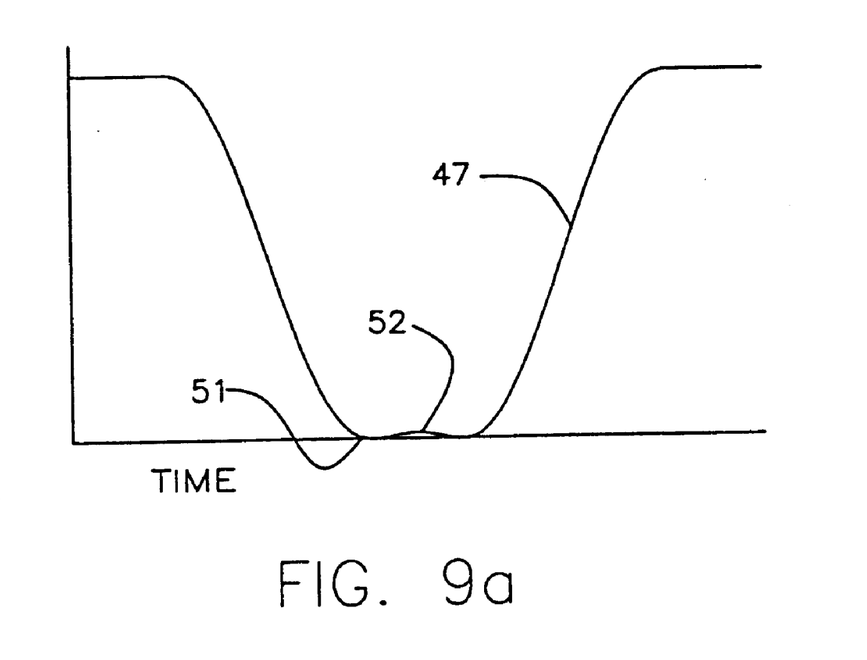

Referring to FIGS. 9a and 9b, sealer motion profiles are shown at 46 and 47 related to the sealing drive shaft 14 and the eccentric link units 13. The drive shaft rotates each complete cycle. The speed of the servo motor 15 may change within each cycle as desired to control the particular profile to be generated and particularly to control a seal dwell period during which the seal bar is held in engagement. Referring to FIG. 9a, a single speed cycle is shown wherein the sealer begins in the raised position and at the appropriate time the oscillatory motion causes the seal bar 10 to drop or lowered to the engaged position in a gradual manner as at 48 to a bottom area which is illustrated with the curved small seal dwell period 49 and then begins to rise in the same manner as it dropped to the top position. During the engaged position 49, the seal 5 is formed. If extended dwell is desired, the servo motor can be programmed to stop when the sealer is in the engaged position 49. This motion is created during the dwell period of the line to permit the appropriate creation of the seal simultaneously with other functions which require other components to have a functioning period such as the punch unit, separation units or other components incorporated into the line.

Sometimes a greater dwell period or sealing engagement may be desired. A characteristic curve is shown in FIG. 9b which requires a somewhat greater time span with the illustrated movement. Thus, the drop and rise times are essentially in accordance with that of FIG. 9a. The dwell period 50 between ceasing of the drop time and the beginning of the rise time, however, is increased and, as shown, may be a shallow "w" shape with two lower positions 51 and 51a joined by a slight rise 52 therebetween. The increased dwell period 50 and engagement time can be achieved by using a drive linkage as shown in FIG. 10. The motor 15 drives the arm 53, at either continuous speed or can change speed within the seal cycle. Arm 53 drives link 53a which in turn drives the cam shaft arm 14 in an oscillatory motion. The geometry of the system can be calculated such that the cam shaft arm oscillates over center giving a motion profile that is "w" shaped. The center portion of the "w" slightly raises the seal bar unit 12 but the system is readily designed with lost motion built into the lower seal bar units. The drive system causes the sealer assemblies to have sharper engage and disengage motion profiles with more seal dwell and with less violent accelerations of the servo motor driving the unit. The increased period defined by the "w" shape is readily available within the total dwell time of the web movement. This particular sequence would not necessarily be required. Thus with the variable speed movement provided by the servo motor, the drop and rise time could of course be varied to increase and provide a more rapid movement and thereby allowing a greater dwell period within a sealer motion otherwise as shown in FIGS. 9a or 9b.

The dwell system thus provides a very effective means of modifying the dwell period in accordance with the particular specifications required based on the thickness of the materials and the like. Other suitable drive systems can of course be provided to obtain the desired result with respect to the movement of the eccentric and the connected seal bar unit.

Figure 11:
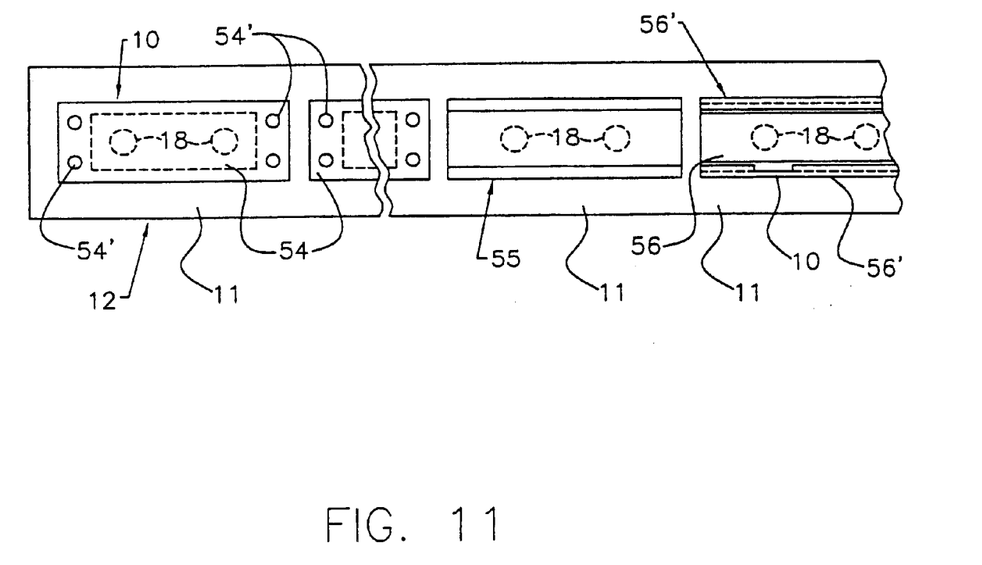
FIG. 11 is an enlarged bottom view of a sealer bar with different seal pattern constructions.

Further, in the above disclosed embodiments of FIGS. 2–9, a single wide seal bar unit is disclosed extending across the width of the plastic web member with a single pattern in the seal. In various applications, a plurality of like or different seal patterns might be required. FIG. 11 is a bottom view of a seal bar 10 illustrating constructions for forming different seal patterns across the web. If the seal were embossed across multiple separate lanes of plastic material, a multiplicity of separate tools 54 may be rigidly interconnected to base bar 10 as at 54' to form the seal bar, or separate bar sections 55 separately connected directly to the beam 11. A similar arrangement might be used if a discontinuous seal pattern is to be applied to a plastic web. Further in other instances, multiple tool or seal pattern inserts 56 may be removably attached individually to the bottom wall of the seal bar. The separate removable inserts may be releasably mounted within a properly formed bottom wall of the seal bar, such as spaced tracks 56'. The seal pattern can then be easily changed by use of a different insert 56.

A servo motor drive system as described provides a highly satisfactory system, particularly where the seal period may be varied.

Figure 12:
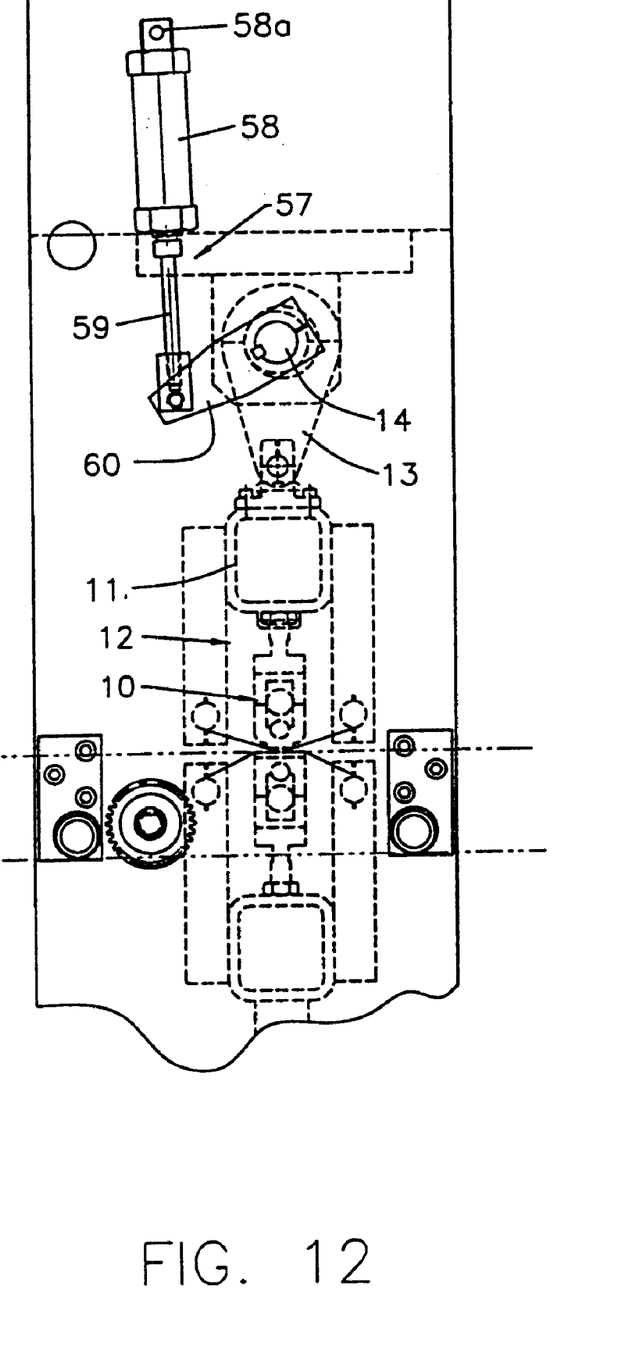
FIG. 12 is a view similar to FIG. 3 illustrating a pneumatic drive system for the movable sealer bar.

Any other form of a drive system can be provided which provides a basic drive for the plurality of separate eccentric drive units or other appropriate mechanical connecting mechanisms. One alternative embodiment is illustrated in FIG. 12. Corresponding elements of the two embodiments are identified by the same numbers. The servo motor system of the first embodiment is replaced by a fluid, preferably air, cylinder unit 57. The cylinder 58 of the cylinder unit 57 is shown pivotably mounted to the side frame 9 as at 58a. The piston rod 59 projects downwardly therefrom and is pivotably secured to the outer end of an eccentric shaft arm 60. The air cylinder stroke is selected to rotate the eccentric arm 60 and establish an appropriate seal pressure and then reverse the rotation to raise the seal bar 10 from the seal position. The rod 59 thus in the fully extended position rotates the lever arm downwardly rotating the eccentric shaft 14 in the appropriate direction for moving the seal bar 10 into the seal position and particularly into the desired pressurized engagement with the substantially stationary seal bar 22 which hold the bar 10 in the seal position for a period and then raises the bar 10 to release the sealed web. The fluid cylinder unit may use any desired fluid and may of course be programmed to produce the "w" shape motion or any other desired dwell and seal pattern.

Any other drive system can be supplied within the scope of this invention, but the servo motor or fluid cylinder arrangement provide a most satisfactory optimum structure which produces the desired accuracy of positioning of the movable seal bar unit in repeated cycles and are well known drives having a long life and ready maintenance in bag machines.

Figure 13:
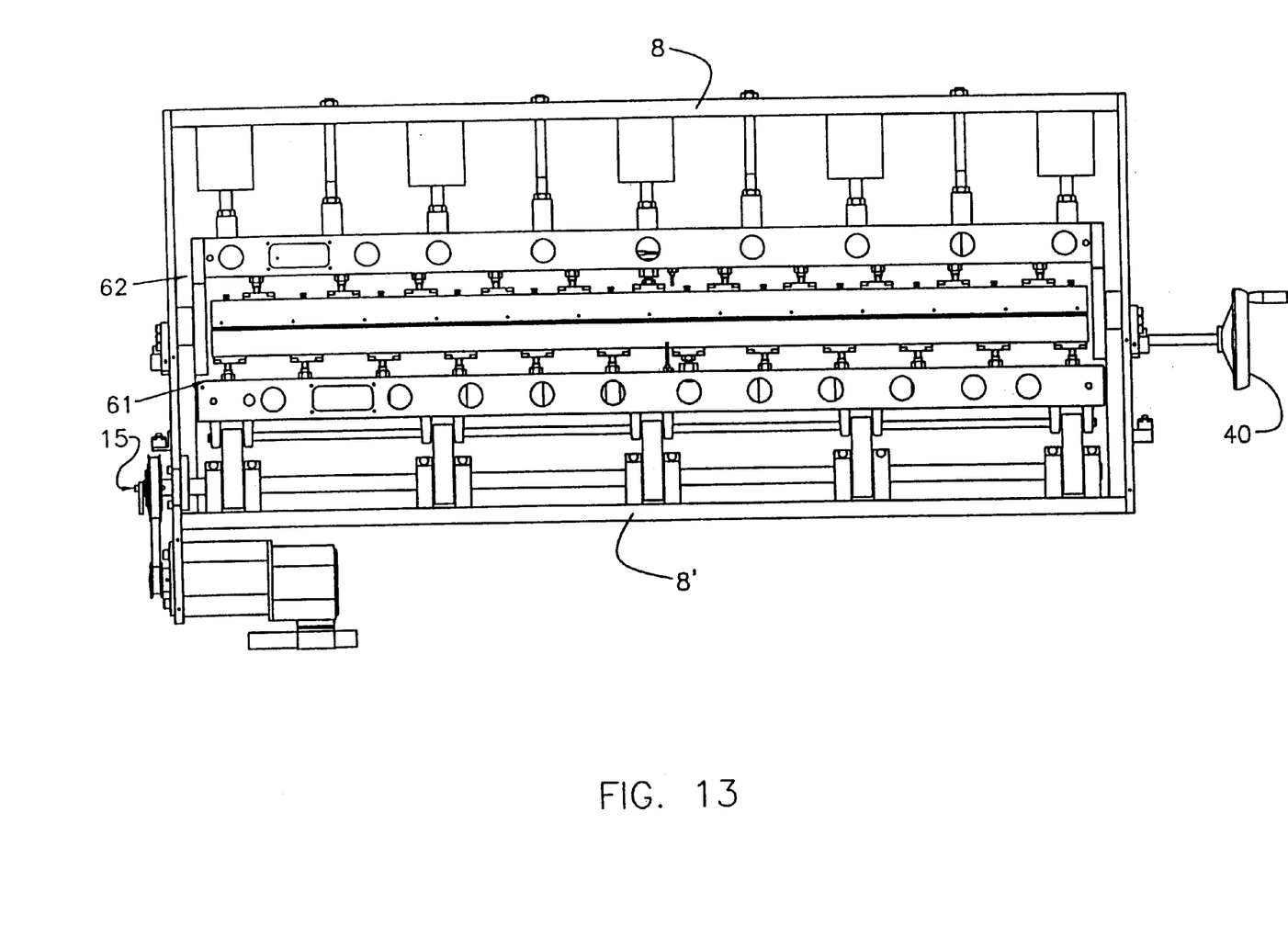
FIG. 13 is a view similar to FIG. 2 illustrating an inverted sealer configuration.

The present invention has thus been illustrated and described with the structure having an upper movable seal bar unit and a stationary lower seal bar unit. Depending upon certain applications and space requirements, the seal units can be reversed with an upper stationary seal bar unit and a bottom movable seal bar unit. This merely requires reorientation of the seal bar unit within the frame structure. The structure of FIGS. 2–6 is illustrated as an inverted assembly in FIG. 13. The only change is that the movable assembly 61 is mounted to the bottom frame 8' and the stationary seal unit 62 is secured to the top frame member 8. In this arrangement the drive means is secured below the frame plate 8'. This of course requires mounting of the frame structure within the bag making machine with the plate 8' raised upwardly of the base support structure of the bag machine to allow for location of the motor beneath the plate 8'. The structure may otherwise have the identical construction. This concept of inversion as previously noted is widely known and applied in the art and merely given herein for purposes of a more complete description of the present invention.

Further, it is well known in the art to provide a plurality of spaced seal units wherein the two sealers are mounted and operated in a series with the adjacent sealers inverted. In this system, the web is heated and sealed from both sides in cyclical sequences. This maintains the film structure sufficiently cool so that it retains sufficient strength to carry the unit through the machine. Such systems are especially effective when running monophase layer films or cold extrusions of films with similar materials which do not retain a sufficient strength when heated to sealing temperatures. Thus, although a single seal is created, it is created in a two-step fashion, the heating action occurring on the opposite sides of the web thereby maintaining its strength sufficiently to allow carrying it through the machine as such. The two stepped sealer assembly may advantageously be built with the present invention.

The present invention thus provides a seal bar assembly without the massive construction of prior art machine which contributed to and limited the machine speed because of the high inertia forces of the moving parts. The prior art seal bar structures required to span the entire seal width of the machine when combined with the individual end cam mechanisms and their associated parts created such a great inertia that control was difficult and machine speed was significantly limited. Although recent designs provided servo motors, with improvement in control during the start and stop sequences, the performance has nevertheless generally been considered inadequate to compliment the other modern high speed bag-making machine components. Further when operated at higher speeds, the prior art device have encountered significant maintenance problems in the sealing apparatus.

We claim:

1. In a plastic forming machine requiring sealing of a plastic web during the formation of plastic members by passing of the plastic web through a sealing apparatus for forming a seal portion across the web, said sealing apparatus comprising a support structure, upper and lower seal bar units extending transversely for a length at least equal to the width of the plastic web moving therebetween, at least one of said upper and lower bar units being mounted for movement into sealing engagement with the other of said seal bar units, comprising the improvement including a drive system mounted substantially in alignment with said movable bar unit and including a drive shaft and a substantial plurality of mechanical connecting units interconnected in longitudinal spaced relation to said shaft and said movable bar unit to establish and maintain an even substantial equidistributed support and force on said shaft over the length of said shaft, each said mechanical connecting unit being configured to rotate with the drive shaft and establish a substantially corresponding vertical motion of said seal bar unit in a substantially perpendicular relationship to said web, said movable seal bar unit being constructed with a substantially low inertia and with said multiple connecting units providing equally distributed physical support for said movable seal bar unit over the total width thereof.

2. The sealing apparatus of claim 1 wherein the other of said upper and lower bar seal units being affixed to said frame structure and providing a substantially fixed stable support.

3. The apparatus of claim 1 or claim 2 wherein each of said seal bar units include a rigid support beam and a seal bar, said support beam being connected to said mechanical connecting unit, a plurality of laterally spaced bar adjustment rigid connector units connecting said beam to said seal bar and including said connector units evenly spaced between and in line with said mechanical connecting units, said connector units on each said seal bar unit being similarly offset with respect to said connectors on the opposed seal bar unit, and thereby providing for natural deflection of the seal bars between the connectors with the natural deflection of each bar being offset and balanced by the deflection of the opposite seal bar whereby the engaged seal bars more fully conform with each other to provide a high seal integrity.

4. The apparatus of claim 3 wherein said connectors of the first seal bar are located substantially centrally between the connectors on the second seal bar.

5. The apparatus of claim 3 wherein said connectors include a nut and a threaded member connected respectively one each to the beam and the seal bar to form a rigid connection between said beams and said seal bar.

6. The apparatus of claim 1 wherein an adjustment unit is connected between each said mechanical connecting units and said seal bar unit for establishing the degree of movement of the seal bar relative to the drive shaft for adjusting the pressure across the web in the sealing position of the seal bar unit.

7. The apparatus of claim 1 wherein one of said seal bar units is a substantially fixed seal bar unit and includes a web engaging surface opposed to and aligned with a web engaging surface of said movable seal bar unit.

8. The apparatus of claim 7 wherein said substantially fixed seal bar unit is supported by a plurality of spaced supports including at least a substantial number of which are cushioning units to support the fixed seal bar unit with a slight amount of lost motion and configured to establish conformity of the stationary seal bar unit with the movable seal bar unit and maintain a constant seal pressure across the web when engaged by the movable seal bar unit.

9. The apparatus of claim 8 wherein said cushioning units are fluid cylinder units, and having means to retract the stationary seal bar unit from the path of the web during termination of machine operation.

10. The apparatus of claim 1 or 2 wherein said movable seal bar unit includes a rigid beam and a seal bar, said mechanical connecting units being connected to said rigid beam, and a plurality of connectors located between each of said connecting means and connecting said seal bar to said rigid beam.

11. The apparatus of claim 10 wherein each of said mechanical connecting units is an eccentric drive unit connected to said drive shaft and said rigid beam.

12. The apparatus of claim 10 wherein each of said connectors is adjustable for locating of said seal bar relative to said rigid beam.

13. The apparatus of claim 1 wherein said mechanical connecting units are mechanical eccentric connectors and include a means for adjusting the stroke length and thereby the movement of the seal bar unit relative to the other seal bar unit.

14. The apparatus of claim 1 including the further improvement wherein each seal bar unit includes a seal bar having a release coating affixed to the surface engaging the web.

15. The apparatus of claim 1 wherein a servo motor is connected to the said shaft for driving said shaft.

16. The apparatus of claim 1 wherein said web includes substantial laminates.

17. The apparatus of claim 1 further including a second seal assembly including upper and lower seal bar units, said second seal assembly having said seal bar units located in reverse vertical orientation to said first named seal bar units.

18. The apparatus of claim 17 wherein said first and second seal bar units have the movable seal bar unit and beam inverted and establish the seal portion in sequence from the opposite sides of the film.

19. The apparatus of claim 1 wherein said drive system includes a variable control and drive unit for varying the rotation of said shaft and the movement of the seal bar unit and thereby the seal engaged dwell period for engaging said web.

20. The apparatus of claim 19 wherein said dwell period is variable between a V-shaped dwell and a substantially W-shaped dwell having a shallow central portion.

21. The apparatus of claim 19 wherein said drive unit includes a driven pivoting arm and a lever arm connected to said pivoting arm and to said eccentric shaft.

22. A seam forming apparatus for generating a series of spaced seams in layered plastic members mounted for step movement through the seam forming apparatus, comprising a frame structure having side members, a first seal support member mounted on said side members on one side of the path of said layered plastic web, said seal support member including a relatively rigid supporting beam structure and a seal bar unit connected to said beam structure, said seal bar unit having a heat sealing surface substantially in the plane of the moving webs, an opposing seal support member extending between and supported in said frame structure for guiding of said opposing seal support member in vertical movement toward and away from said first seal support member for selective engagement with the web, a drive shaft structure secured to said frame structure in spaced relation to said movable seal member and fixed to said frame structure for rotation, a substantial plurality of spaced and compact eccentric drive units interconnected between said drive shaft and said movable seal member and establishing a substantially equal force over the length of said drive shaft and said movable seal beam for moving of said movable seal member into sealing engagement with the opposing seal member to create a cross seam in the said web, said movable seal member being mounted and controlled to provide a timed engagement with the web for heating of the web to form a predetermined seam, said eccentric drive units supporting said movable seal bar providing a direct equalized pressurization of said seal bar throughout its length whereby said seal bar unit establishes a substantially low inertia load.

23. The apparatus of claim 22 wherein said movable seal unit is selectively mounted above said web or below said web path and said fixed seal bar unit is oppositely mounted below or above said web path.

24. A plastic bag making apparatus having a relatively wide plastic web passed through a movable seal bar assembly for creating a thermal seal substantially across the width of the plastic web and wherein said assembly includes a cyclically operated seal bar unit driven from a rotatable shaft and including an opposed stationary seal bar unit, the improvement in said movable seal bar unit comprising a rigid lightweight beam extended across the width of said plastic web, a seal bar, a substantial plurality of rigid connecting units connected to said seal bar and to said rigid lightweight beam and forming a lightweight beam supported seal bar unit, a substantial plurality of mechanical linkages interconnecting of said rigid lightweight beam in place and constructed and arranged for connection upon said rotatable shaft for forming a series of mechanical connection and a reciprocal movement of said movable seal bar unit, said mechanical linkages being configured to directly rotate with the shaft and establish a substantially rectilinear motion of said movable seal bar unit in perpendicular relationship to said web and in alignment with the opposed stationary seal bar unit, said movable seal bar unit being constructed with a substantially low inertia and with said multiple linkages providing the physical support for said low inertia bar assembly throughout the width thereof.

25. The apparatus of claim 24 wherein the movable seal bar is connected to the beam by a plurality of adjustable connectors including a very substantial number of said connectors in excess of said mechanical linkages and supporting the seal bar between said linkages, said seal bar unit operating under bag pressures with a natural, slight deflection of the seal bar between the connecting units.

26. The apparatus of claim 25 wherein said stationary seal bar unit includes a beam and a seal bar connected to said beam by a corresponding plurality of said connectors, said connectors of said second seal bar unit being offset with respect to the connectors of the first seal bar unit whereby when said seal bar units are mounted in opposing relation with the natural deflection of each seal bar balancing the deflection of the opposite seal bar unit whereby the opposed seal bars more fully conform with each other for contributing to creation of a high seal integrity.

27. The apparatus of claim 24 wherein said stationary seal bar unit includes a plurality of fixed support members and fluid cylinders interconnected to selected fixed support members to establish a very slight amount of lost motion of said stationary seal bar and designed and configured to establish conformity of the movable and stationary seal bar units and maintain a constant seal pressure across said web when engaged by said movable seal bar unit.

28. The apparatus of claim 27 wherein said cylinder units are air cylinders and include a control for retracting of the stationary seal bar unit from the path of the web.

\* \* \* \* \*